US008844055B2

(12) United States Patent
Follis et al.

(10) Patent No.: US 8,844,055 B2
(45) Date of Patent: Sep. 23, 2014

(54) METHODS AND SYSTEMS FOR ESTABLISHING AND ENFORCING DOCUMENT VISIBILITY RIGHTS WITH AN ELECTRONIC SIGNATURE SERVICE

(75) Inventors: Benjamin David Follis, Redwood, CA (US); Eran Aloni, Los Altos, CA (US)

(73) Assignee: Adobe Systems, Incorporated, San Jose, CA (US)

( * ) Notice: Subject to any disclaimer, the term of this patent is extended or adjusted under 35 U.S.C. 154(b) by 27 days.

(21) Appl. No.: 13/447,033

(22) Filed: Apr. 13, 2012

(65) Prior Publication Data

US 2014/0041052 A1 Feb. 6, 2014

(51) Int. Cl.
*G06F 7/04* (2006.01)
*G06F 17/30* (2006.01)

(52) U.S. Cl.
USPC ............................................. 726/28; 713/176

(58) Field of Classification Search
USPC ........................................................... 726/28
See application file for complete search history.

(56) References Cited

U.S. PATENT DOCUMENTS

| 7,954,043 B2 * | 5/2011 | Bera | 715/200 |
| 8,316,237 B1 * | 11/2012 | Felsher et al. | 713/171 |
| 2004/0107224 A1 * | 6/2004 | Bera | 707/203 |
| 2005/0108536 A1 * | 5/2005 | Karimisetty et al. | 713/176 |
| 2008/0072334 A1 * | 3/2008 | Bailey et al. | 726/28 |
| 2009/0024912 A1 * | 1/2009 | McCabe et al. | 715/224 |
| 2011/0138478 A1 * | 6/2011 | Kaarela et al. | 726/27 |
| 2011/0231666 A1 * | 9/2011 | Guenther | 713/186 |
| 2012/0185759 A1 * | 7/2012 | Balinsky et al. | 715/209 |
| 2012/0191979 A1 * | 7/2012 | Feldbau | 713/178 |
| 2012/0278251 A1 * | 11/2012 | Pinsker et al. | 705/342 |

OTHER PUBLICATIONS

Qiong Liu; Digital Rights Management for Content Distribution; Year:2003; ACM; pp. 1-10.*

* cited by examiner

*Primary Examiner* — Mohammad W Reza
*Assistant Examiner* — Monjour Rahim
(74) *Attorney, Agent, or Firm* — Shook, Hardy & Bacon L.L.P.

(57) ABSTRACT

Techniques for generating and enforcing document visibility rights associated with a document in use with an electronic signature service are described. Consistent with embodiments of the invention, document visibility rights can be established for each person designated to sign and/or receive a copy of a document, and on a per-page, per-document section, or per-source document basis. Additionally, visibility rights may be conditional, such that various events (including the singing of a document) may modify visibility rights making a previously un-viewable page or document section viewable to a particular person.

16 Claims, 5 Drawing Sheets

METHODS AND SYSTEMS FOR ESTABLISHING AND ENFORCING DOCUMENT VISIBILITY RIGHTS WITH AN ELECTRONIC SIGNATURE SERVICE

TECHNICAL FIELD

The present disclosure generally relates to electronic signature services. More specifically, the present disclosure relates to methods, systems and computer program products for establishing and enforcing document visibility rights for documents in use with an electronic signature service.

BACKGROUND

Obtaining a person's hand-written signature on a document can be a time consuming task. Fortunately, electronic signatures have become widely accepted. Although there are many different legal definitions for what exactly constitutes an electronic signature, generally an electronic signature is a digital mark (e.g., a set of characters or an image representative of a name) generated with some electronic means (e.g., with a computer or other electronic device) and that is attached to, or otherwise associated with an electronic or digital document, and intended to serve the same purpose as a hand-written signature. Various electronic signature services have made the process of obtaining an electronic signature far more efficient than the time consuming task of obtaining a hand-written signature. Unfortunately, many conventional electronic signature services do not support anything more than the most basic of workflows, and thus, do not provide the customization and flexibility that is frequently needed to control who can access and view a document, or a portion of a document, and control when that access and visibility is permitted.

DESCRIPTION OF THE DRAWINGS

Some embodiments of the invention are illustrated by way of example and not limitation in the figures of the accompanying drawings, in which.

DETAILED DESCRIPTION

Figure 1:
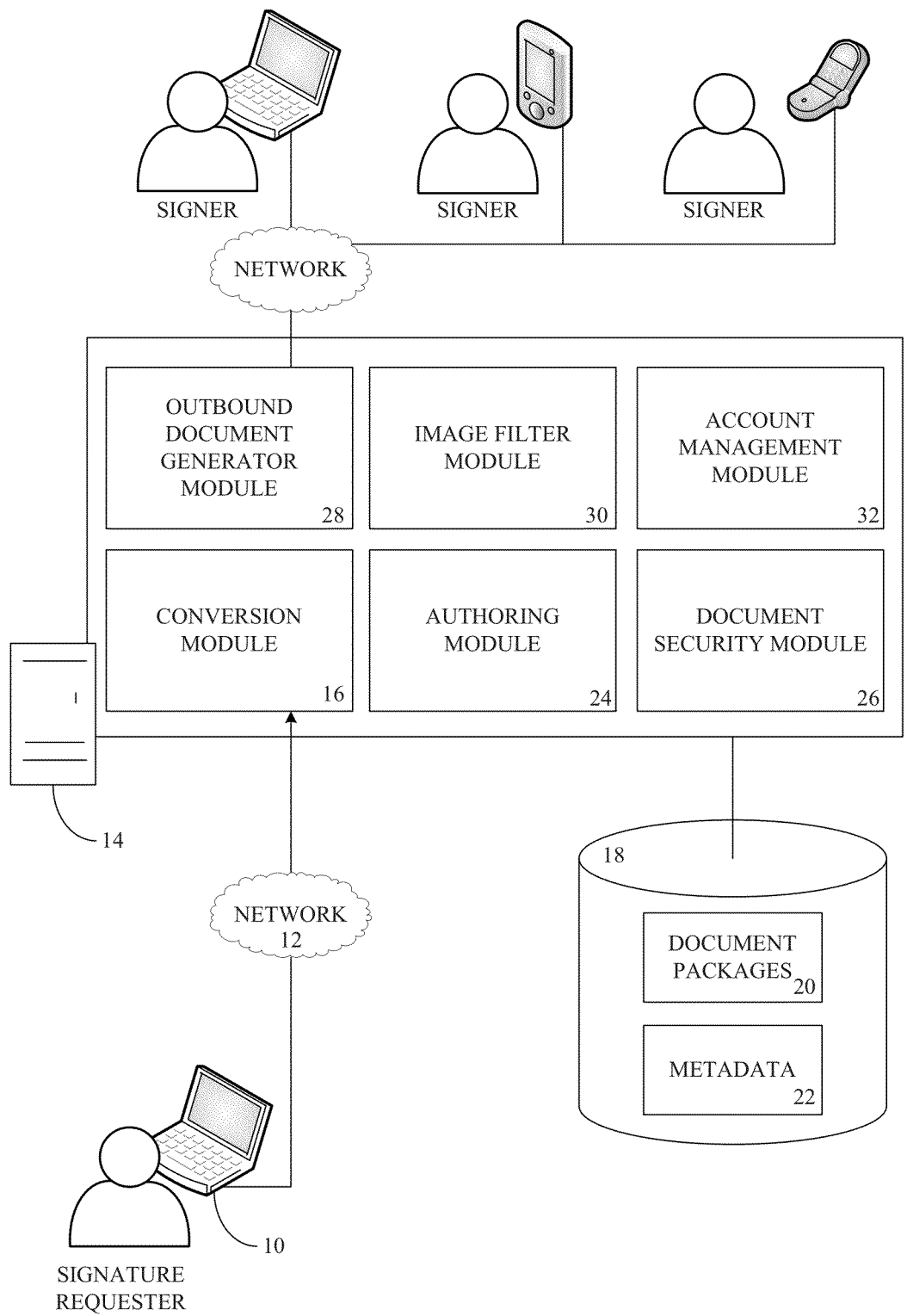
FIG. 1 is a block diagram illustrating an example of a network environment including a server operating an electronic signature service capable of generating and enforcing document visibility rights, consistent with embodiments of the invention.

The present disclosure describes methods, systems, and computer program products, which individually provide functionality for defining and enforcing document visibility rights for documents in use with an electronic signature service. In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

For purposes of the present disclosure, the terms "document author", "document originator" and "signature requester" are used synonymously to refer to a person who is utilizing an electronic signature service to request that one or more persons electronically sign an instance of a document package. As such, the document author or document originator may or may not be the actual author of a particular written work product. Additionally, the term "document package" is used herein to refer to the document that is generated by the electronic signature service. For example, from the perspective of the electronic signature service, a document package may in fact be comprised of several original documents or source documents, with each original or source document being a file that has been uploaded to a server providing the electronic signature service. Accordingly, the electronic signature service takes as input one or more original or source documents (e.g., individual source files) that are uploaded to the server providing the electronic signature service, performs various operations on the input files, and then manages the one or more files as a single instance of a document, referred to herein as an instance of a document package, for purposes of any signature operations that are to be performed with the one or more uploaded files. As such, the term "document package" is used to refer to a document (or group of documents) that have been uploaded to the server of the electronic signature service, and managed as a single instance of a document by the electronic signature service. Therefore, from the perspective of the electronic signature service, an instance of a document package may in fact be several input files (e.g., source documents), along with any metadata that is generated and associated with any one of the input files that makes up the document package.

Consistent with some embodiments of the invention, a web-based electronic signature service includes what is referred to herein as a document security module that enables a document author to establish one or more default document visibility rights, and/or establish custom document visibility rights that define who can view individual portions of a document package, for example, on a per-document section, or per-page basis, and based on the relationship of a person to the document. For instance, with some embodiments, a document signer may, by default, have visibility rights allowing the document signer to view only those source documents (e.g., input files) that the document signer is being requested to sign. With some embodiments, the default rules may be overridden with custom document visibility rights. For example, the document author may specify on a per-page, per-document section, or per-source document basis the visibility rights that each signer will have with respect to the document package. Additionally, with some embodiments of the invention, document visibility rights are defined as rule-based rights, for example, using conditional statements, such that the evaluation of a rule may define the document visibility right. Similarly, the occurrence or detection of a particular event may trigger a change in a document visibility right associated with or assigned to a particular portion of a document. For example, the specific pages that are visible to a particular document signer or recipient may change upon one or more parties signing the document package.

A brief example is provided to illustrate the many advantages obtained with some embodiments of the invention. By way of example, suppose that John Doe is a contract manager for XYZ Corp. John frequently enters into agreements with third-party vendors using a ten page contract agreement that is generally the same for every agreement entered into, but has a three page addendum that is typically customized for each agreement. Before John can send the contract to another party for execution, John's supervisor must review the agreement and provide his authorization. Accordingly, John will generally provide his supervisor with three separate documents consisting of 1) the ten page agreement, 2) the three page addendum to the agreement, and 3) a one page summary highlighting the contents of the agreement and the addendum combined. John's supervisor will generally review the one page summary and sign at the bottom of the page to indicate his authorization for entering into the agreement with the third party. Without using an electronic signature service, the time it takes to route a physical paper copy of the agreement (with summary and addendum) from John to his supervisor, back to John, to the third party, and then back to John, may take several days, if not weeks. Furthermore, John must ensure that the one page summary, signed by John's supervisor is not inadvertently sent along with the agreement and addendum to the third party.

With an embodiment of the invention, John can upload to a server providing the electronic signature service three files representing digital or electronic versions of the ten-page agreement, the addendum and the one-page summary. After the three separate documents have been uploaded to the server, the documents will be transformed or converted by a conversion system or module. For example, the input or source documents may be converted to a conventional portable document format (PDF) that provides an electronic image of text and graphics that looks like a printed document and can be viewed, printed and electronically transmitted. One such document format is commonly referred to as a PDF file format. Accordingly, the three input files will be converted to a single document package, formatted as a PDF file, and associated with various metadata.

Next, using an authoring system or module, John can specify who is to receive a copy of the document package as part of a request for signature, and what action (if any) that person is being requested to take with respect to the document package. Specifically, with some embodiments, the particular email address field (e.g., "TO", or "CC") will indicate the relationship between the document recipient and the document package. With some embodiments, a person whose email address is specified in the "TO" email address field is being requested to sign the document, and is therefore a document signer with respect to the document package. A person whose email address is specified in a "CC" (e.g., carbon copy) email address field may receive information relating to the signature request, but not be requested to actually sign the document package. For instance, a person whose email address specified in the "CC" field may simply receive a copy of the signed document package, when all parties have signed. With some embodiments, the relationship between document recipient and document package may be specified in some other way, for example, by simply selecting a role (e.g., signer, recipient, etc.) for a document recipient whose email address appears in one of the email address fields (e.g., "To", "CC", or "BCC") from a list of possible roles shown in a drop down list, or some similar user interface element.

Additionally, using the authoring system, John can add signature and date fields in the desired locations on any one of the three input documents. For example, John may first specify email addresses for each person who is to receive and sign a copy of the document package. Next, John can add a signature field to indicate the position on the summary page where John's supervisor is to provide his electronic signature. Additionally, John may add a signature field to the ten-page agreement in the location where the third party is to sign, as well as the location where John himself is to sign. With some embodiments, an email address of a document recipient may be associated with each signature field, to indicate the particular person who is to sign in that place. The authoring system generally operates in conjunction with a user interface module to enable the document author or signature requester to visually indicate with graphical user interface (GUI) tools the signature and date fields. For instance, with some embodiments, drag and drop operations, and similar GUI techniques may be used to specify the locations of the signature and date fields.

Next, John may interact with a user interface associated with the document security module to establish the document visibility rights for the document package. John may, for example, specify that the one page summary is only to be viewable by his supervisor, and is not viewable to the third party. Once John has indicated the document visibility rights, a document security manager module will process the document to generate metadata defining the visibility right. The metadata is then stored in association with the document package. When a document recipient (e.g., a signer) attempts to access the document, an outbound document generator module will process the requested document package and its associated document visibility rights to generate an instance of the document package with viewable pages that are appropriate for the person requesting the document package. For instance, when John's supervisor requests access to the document, the one page summary will be viewable. However, when the third party requests to view the document package, the instance of the document package that is generated and presented to the third party will not include as a viewable page the one page summary of the agreement.

With some embodiments of the invention, the document visibility rights may be generated as conditional rules, such that the particular visibility right assigned to one person may change upon detection of a particular event. In particular, with some embodiments, the document author or signature requester can specify that one or more pages, one or more of the original source documents that make up the document package, or a document section (defined by some other document partitioning mechanism) are only to be viewable upon all parties, or a particular party signing the document package. Accordingly, prior to detection of the event, the document visibility rights may prevent all pages from being viewed, and subsequent to one or all parties signing the document package, the document visibility rights are modified to allow all pages or document sections to be viewed by a particular document recipient. Other advantages and aspects of the inventive subject matter will be readily apparent from the description of the figures that follows.

FIG. 1 is a block diagram illustrating an example of a network environment including a server operating an electronic signature service capable of generating and enforcing document visibility rights, consistent with embodiments of the invention. As shown in FIG. 1, a signature requester is operating a desktop computer 10 to access over a network 12, with a conventional web browser application or other document rendering application, an electronic signature service executing at the server with reference number 14. With the browser application executing at the desktop computer, the signature requester can upload one or more documents to the electronic signature service, specify the email addresses (or other messaging addresses) of one or more persons who are to sign the documents, and request that the documents be signed. Upon making the request, an email or other electronic message (e.g., SMS, or text message, instant message, etc.) is communicated from a server associated with the electronic signature service to a computing device of the document recipients whose email address (or other messaging address) has been provided. For instance, with the example of FIG. 1, the document signers are shown operating a laptop, mobile tablet device, and mobile phone, any one of which is compatible with embodiments of the invention. The message typically will include a link, or otherwise provide an address (e.g., Uniform Resource Locator (URI)) associated with a web page hosted by the electronic signature service at which an instance of the document package can be accessed.

As illustrated in FIG. 1, the electronic signature service includes a variety of functional modules. One skilled in the art will appreciate that the functional modules are implemented with a combination of software (e.g., executable instructions, or computer code) and hardware (e.g., at least a memory and processor). Accordingly, as used herein, with some embodiments a module is a (processor-implemented module and represents a computing device having a processor that is at least temporarily configured by executable instructions stored in memory to perform one or more of the particular functions that are described herein.

As shown in FIG. 1, the electronic signature service includes a conversion module 16. In general, the conversion module 16 will receive one or more original input documents (e.g., files), over a network. For instance, the signature requester may upload the one or more input files to the electronic signature service. Once received, the conversion module 16 is triggered to perform a conversion operation on the one or more input files. In particular the conversion module 16 will process the individual input files to generate a single document package in a portable document format, such as a PDF file. Of course, other document or file formats may be used. In addition, the conversion module 16 may generate metadata that is stored in the database in association with the document package. For example, as illustrated in FIG. 1, the database with reference 18 is shown to be storing document packages 20 (e.g., processed input files), and associated metadata 22.

The electronic signature service additionally includes an authoring module 24. The authoring module 24 operates in conjunction with a user interface module (e.g., a web server module, not shown), to enable the signature requester to provide a variety of information (e.g., configuration parameters or settings) used with the signature request. For example, with some embodiments, the authoring module 24 provides a graphical user interface with which the signature requester can specify the location (e.g., page and position on page) of signature fields, date fields, or fields where a person is to provide his or her initials, and any other similar type of field that may be used to receive input data. This may be achieved, for example, by simply dragging and dropping various user interface elements, and then manipulating the size and position of those elements.

In addition to allowing the signature requester to add, delete, or otherwise edit fields within the document package, the authoring module 24 facilitates the establishment of document visibility setting for each person who has been specified to receive and/or sign a copy of document package. For example, using a graphical user interface associated with the authoring module 24, the document author or signature requester may specify that certain document recipients are to have visibility or access rights that allow that person to view only some portions (e.g., source documents, document sections, or pages) of the document package. With some embodiments, document visibility rights can be established for each person who is to receive and/or sign the document, and can be specified on a per-page, per-document section, or per-source document basis. Additionally, with some embodiments, document visibility rights may be defined for each person based on membership in a group. For instance, with some embodiments, the electronic signature service will allow users to generate accounts, and then add persons as users) to the account. Accordingly, a signature requester may specify that certain portions of a document package are to be visible to only those persons who are members of, or otherwise associated with, a particular account, group or sub-group. Similarly, with some embodiments, visibility rights may be defined based on membership with a domain, such that various portions of a document may be visible or not visible to persons based on the domain name portion of their email address, or other messaging address.

With some embodiments, the authoring step may be an optional step, as indicated by the dotted line with reference number 53. Accordingly, with some embodiments, the conversion module 16 may identify text-tags that are embedded in the source documents, and automatically convert those tags into fields. As such, in some instances the authoring step can be bypassed. In such instances, the conversion module 16 will output a document package with corresponding metadata including any fields that have been automatically generated as the result of processing embedded text-tags in the source documents.

As illustrated in FIG. 1, the electronic signature service includes a document security module 26. The document security module 26 receives as input one or more configuration settings or parameters provided by the signature requester, and calculates the document visibility rights for each person to whom the document is being sent, or from whom a signature is being requested. With some embodiments, the document security module 26 may use as input in calculating or deriving the document visibility rights any one or more of the document package, including any metadata, such as the information specifying the fields that have been associated with the document package, the relationship of each document recipient to the document package, as well as any default and/or custom visibility settings provided by the document author, or signature requester. The document security module 26 uses the input to generate for each person having a relationship with the document package a list of pages, or document sections, that the particular person is authorized to view. The information representing the document visibility rights is then stored (e.g., as metadata 22) in association with the document package for subsequent use by the outbound document generator module 28.

Subsequent to generating the document visibility rights, the document author or signature requester may invoke a request to have the document signed. In response, the electronic signature service will communicate a message (e,g., un email, or other electronic message) to each person specified as having a relationship with the document package. The message will include a link to a web page at which the document package can be accessed. With some embodiments, each link will be customized for each person having a relationship with the document package, such that selecting the link will cause a request for the document package to be communicated to the electronic signature service, with information identifying the particular person on whose behalf the request is being made. Accordingly, when the electronic signature service processes the request, the electronic signature service will first determine the identity of the person making the request. Next, the document visibility rights associated with the identified person are retrieved. Finally the outbound document generator module 28 will generate an instance of the document package that has viewable pages appropriate for the person who has requested access to the document package, based on the document visibility rights.

As illustrated in FIG. 1, the electronic signature service also includes an image filter module 30. The image filter module 30 will take as input the name or message address of a person who has a relationship to the document package (e.g., the agreement), as well as a particular version of the document package, and will output a list of un-guessable and un-forgeable uniform resource locators (URLs) to view pages of the document package as images. As such, the image filter module 30 makes it possible to present images of the document package (e.g., such as thumbnail images), while enforcing the document visibility rights associated with the person who may be requesting the image.

With some embodiments of the invention, an account management module 32 provides an account administrator with the ability to manage various aspects of an account created with the electronic signature service. In particular, with some embodiments, an administrator of the account may be able to define various groups of users, for instance, by adding users to the account, and/or by generating different groups or sub-groups and then assigning users to those groups and sub-groups. Accordingly, when a document author or signature requester is assigning document visibility rights, the document visibility rights may be assigned to specific groups, such that each person within that group will have the same document visibility rights with respect to a particular document package and will be able to view the same set of pages of the document package.

Figure 2:
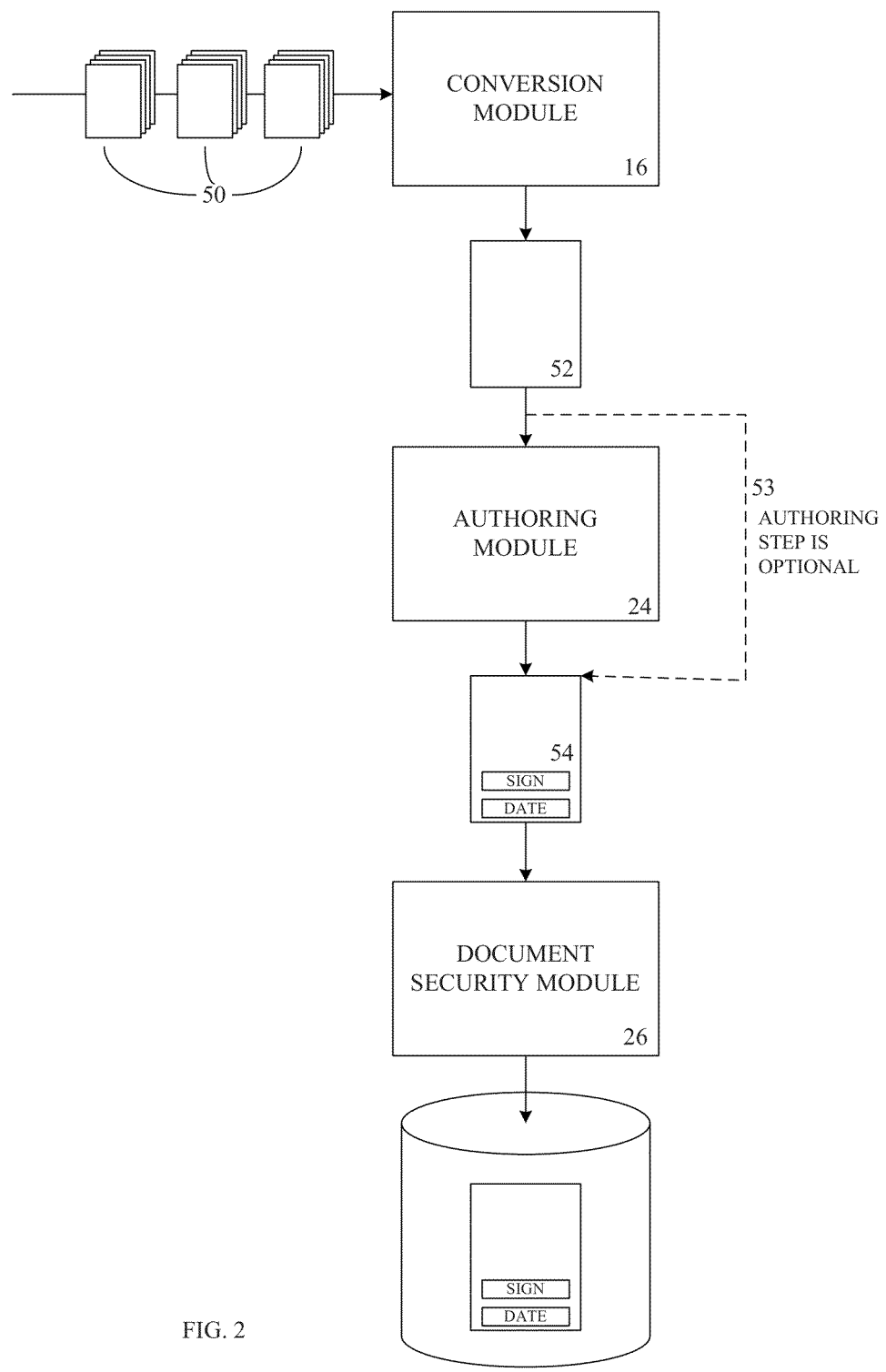
FIG. 2 is a block diagram illustrating a flow of data through various functional modules of an electronic signature service and for generating a document package with corresponding document visibility rights consistent with some embodiments of the invention.

FIG. 2 is a block diagram illustrating a flow of data through various functional modules of an electronic signature service and for generating a document package with corresponding document visibility rights consistent with some embodiments of the invention. In general, the process begins when a signature requester uploads one or more source documents 50 to the server operating the electronic signature service. Once uploaded, a conversion module 16 converts the source documents to a document package 52 with metadata relating to the source documents. With some embodiments, the document package is a PDF file, but in other embodiments, other file formats might be used.

Next, using an authoring module 24, the signature requester can provide the names or message addresses (e.g., e-mail addresses) of the persons who are to sign and/or receive a copy of the document package 52. Additionally, using the authoring module 24, the signature requester can add (and edit) signature and date fields to the document package. In addition, the signature requester may specify which pages that each person who is to receive and/or sign a copy of the document package is able to view. With some embodiments, the signature requester may specify that certain events, such as the signing of the document package by one or more parties, are to make additional sections or pages of the document package visible to different persons. For example, the signature requester may specify that upon signing, or, upon all parties signing the document package, a certain section or set of pages will become viewable to one or more parties. When the signature requester has completed the document authoring process, the authoring module 24 outputs a document package 54 with various associated metadata defining the locations of the signature and date fields, and so forth.

Next the document security manager 26 uses the input received during the authoring process to generate the document visibility rights that are to be associated with the document package. The document security manager 26 will store the generated document visibility rights in association with the document package so that the outbound document generator module 28 will be able to enforce the document visibility rights when generating an instance of the document package to be viewed by each person who is to sign and/or receive a copy of the document package.

Once the document security module 26 has generated and stored the document visibility rights, the signature requester can initiate a request to have the relevant source document or documents signed. With some embodiments, upon initiating such a request, a message is sent to each person who has been designated by the signature requester to receive and/or sign a copy of the document package. The message will include a link or URL to a web page hosted by the electronic signature service and at which the document package can be accessed. With some embodiments, the link included in each message uniquely identifies a person associated with the document, such that, when that person invokes the link and directs a request for the document package to the electronic signature service, the request will identify the person on whose behalf the document is being requested. The processing of such a request is described below in connection with FIG. 3.

Figure 3:
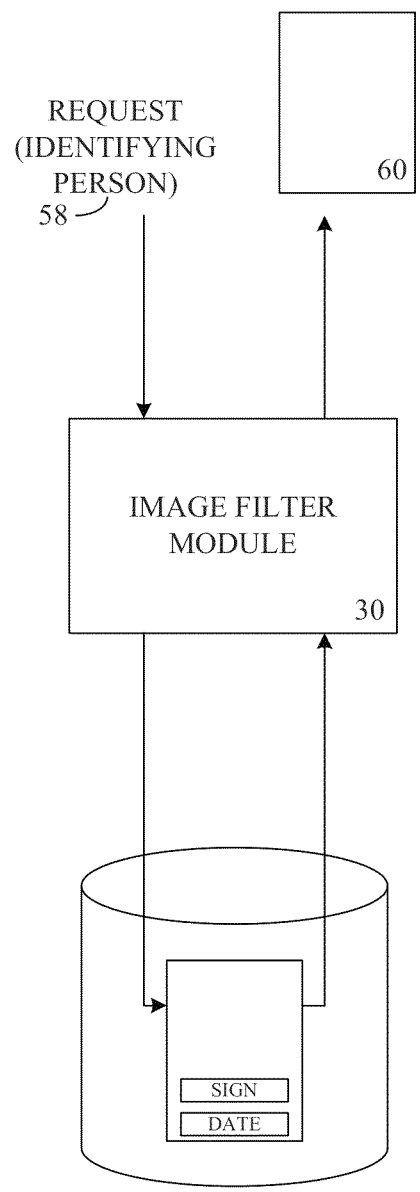
FIG. 3 is a block diagram illustrating an example of how an image filter module, consistent with an embodiment of the invention, applies or enforces document visibility rights upon receiving a request for a document package.

FIG. 3 is a block diagram illustrating an example of how an image filter module 30, consistent with an embodiment of the invention, applies or enforces document visibility rights upon receiving a request for a document package. As illustrated in FIG. 3, when a document recipient (e.g., a signer or viewer) invokes request to view an image of the document (e.g., in his or her web browser), the image filter module 30 will first determine which person associated with the document package has generated the request to view the document package. With some embodiments, the request will include an identifier associated with the person. The identifier may then be used to access the metadata, and the document visibility rights for the person invoking the request in particular. Using the document visibility rights associated with the person requesting the document package, the image filter module 30 will generate images of an instance (e.g., a version) of the document package 60 with only those pages which are to be included as viewable pages, as indicated by the document visibility rights. These images of the instance of the document package are then presented to the person who has invoked the request.

FIG. 3 is a block diagram illustrating an example of how an image filter module 30, consistent with an embodiment of the invention, applies or enforces document visibility rights upon receiving a request for a document package. As illustrated in FIG. 3, when a document recipient (e.g., a signer or viewer) invokes a request to view an image of the document (e.g., in his or her web browser), the image filter module 30 will first determine which person associated with the document package has generated the request to view the document package. With some embodiments, the request will include an identifier associated with the person. The identifier may then be used to access the metadata, and the document visibility rights for the person invoking the request in particular. Using the document visibility rights associated with the person requesting the document package, the image filter module 30 will generate images of an instance (e.g., a version) of the document package 60 with only those pages which are to be included as viewable pages, as indicated by the document visibility rights. These images of the instance of the document package are then presented to the person who has invoked the request.

Figure 4:
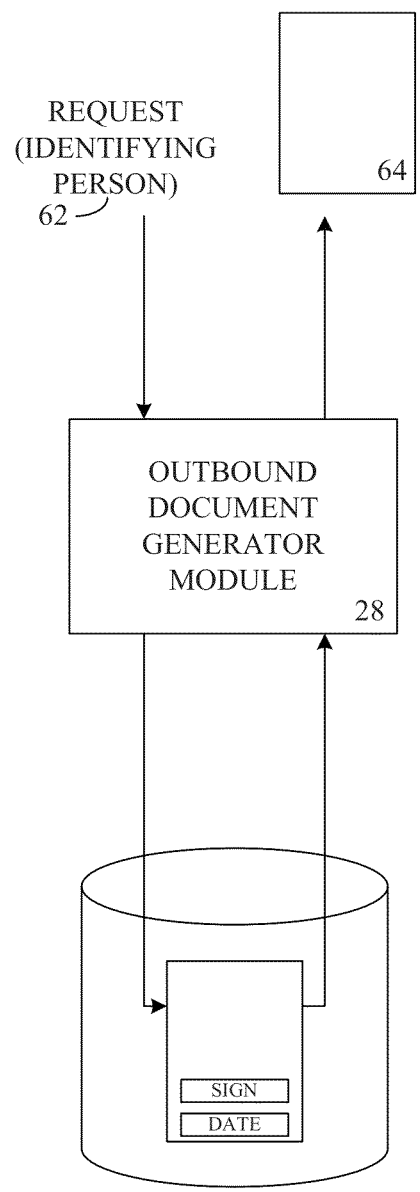
FIG. 4 is a block diagram illustrating an example of how an outbound document generator module, consistent with an embodiment of the invention, applies or enforces document visibility rights.

In addition to invoking a request to view images of the document package, a person may invoke a request to download a copy of the document package. FIG. 4 is a block diagram illustrating an example of how an outbound document generator module 28, consistent with an embodiment of the invention, applies or enforces document visibility rights upon receiving a request to download a document package. As illustrated in FIG. 4, when a document recipient (e.g., a signer or viewer) invokes a request 62 to download a document, the outbound document generator module 28 will first determine which person associated with the document package has generated the request to download the document package. With some embodiments, the request will include an identifier associated with the person. The identifier may then be used to access the metadata, and the document visibility rights for the person invoking the request in particular. Using the document visibility rights associated with the person requesting the document package, the outbound document generator module 28 will generate an instance (e.g., a version) of the document package 64 with only those pages which are to be included as viewable pages, as indicated by the document visibility rights. This instance of the document package is then transmitted to the client device being operated by the person who has invoked the request.

With some embodiments, after a signature requester has invoked a request to have others sign a particular source document within a particular document package, the electronic signature service may send a message to the person who is being requested to sign the document, where the message includes a unique Lira to an image of the first page in the document package that the person is authorized to view. In addition, the message may include a PDF file, as an attachment, containing only those pages that the person is authorized to view, as determined by the document visibility rights for that person. Accordingly, with some embodiments, the outbound document generator module 28 and the image filter module 30 may be invoked in parallel to process the document package and the document visibility rights of a particular person, so as to generate the correct image(s) and corresponding URLs, along with a PDF for inclusion in the message.

As such, the methods or processes depicted in FIGS. 3 and 4 may occur essentially in parallel, in some instances.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules, engines, objects or devices that operate to perform one or more operations or functions. The modules, engines, objects and devices referred to herein may, in some example embodiments, comprise processor-implemented modules, engines, objects and/or devices.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In sonic example embodiments, the processor or processors may be located in a single location (e.g., within a home environment, an office environment or at a server (arm), while in other embodiments the processors may be distributed across a number of locations.

Figure 5:
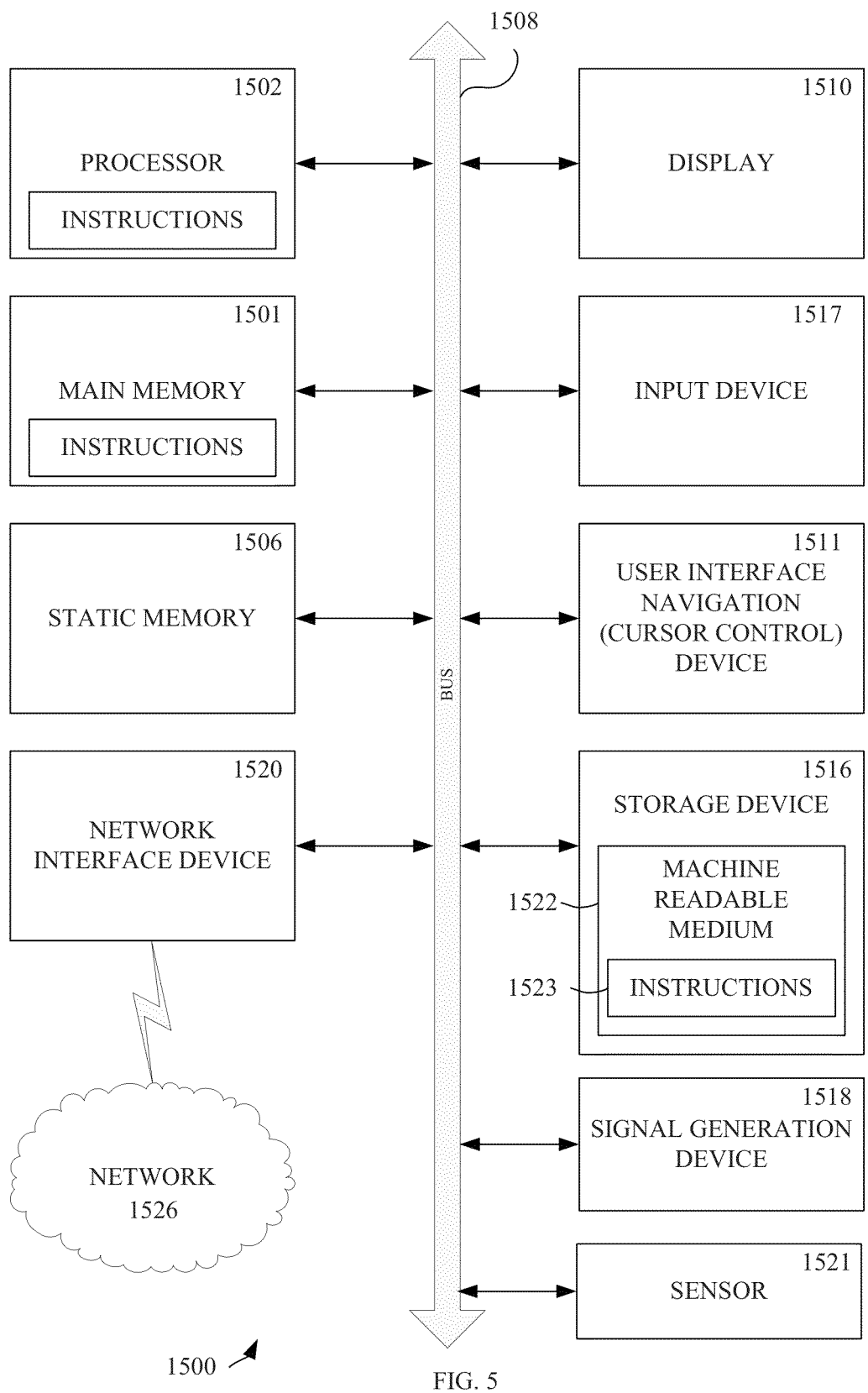
FIG. 5 is a block diagram of a machine in the form of a computing device within which a set of instructions, for causing the machine to perform any one or more of the methodologies discussed herein, may be executed.

FIG. 5 is a block diagram of a machine in the form of a computer system or computing device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. In some embodiments, the machine will be a desktop computer, or server computer, however, in alternative embodiments, the machine may be a tablet computer, a mobile phone, a personal digital assistant, a personal audio or video player, a global positioning device, a set-top box, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). 1n one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media. (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
    receiving at a server operating an electronic signature service a plurality of files representing source documents, wherein at least one respective source document includes associated metadata defining visibility rights and signature requirements for the respective source document;
    converting the plurality of files to a single file representing a document package having a file format consistent with a portable document format (PDF);
    receiving a plurality of message addresses with each message address identifying a person, of which at least one person is to execute a source document included in the document package by providing an electronic signature to be associated with the source document;
    generating document visibility rights and signature requirements corresponding to one or more people identified by the plurality of message addresses for each portion of the document package at least partially based on the metadata defining visibility rights and signature requirements for the at least one source document; and
    communicating a message to each of the message addresses associated with a person, each message having a customized link to access the portions of the document package based on the visibility rights and to submit digital signatures required by the signature requirements.

2. The method of claim 1, further comprising:
    receiving a request to view the document package;
    determining which person is associated with the request;
    accessing the document visibility rights of the particular person associated with the request;
    generating with an image filter module images of an instance of the document package with only those pages that the particular person has been authorized to view, as indicated by the document visibility rights for that particular person.

3. The method of claim 1, further comprising:
    receiving a request to download the document package;
    determining which person is associated with the request;
    accessing the document visibility rights of the particular person associated with the request;
    generating with an outbound document generator module an instance of the document package with only those pages that the particular person has been authorized to view, as indicated by the document visibility rights for that particular person.

4. The method of claim 1, wherein generating document visibility rights and signature requirements corresponding to one or more people identified by the plurality of message addresses for each portion of the document package includes specifying-the pages of the document package that one or more groups of people can view.

5. The method of claim 4, wherein generating document visibility rights for each person includes generating document visibility rights for each person based on which group of the one or more groups the person is a member.

6. The method of claim 4, wherein at least one group is defined by an account established with the electronic signature service.

7. The method of claim 4, wherein at least one group is defined by a domain name of a message address of persons to receive and/or sign a source document in the document package.

8. The method of claim 1, wherein a document visibility right for one person that is to receive or sign a source document in the document package is established as a conditional rule such that at least one or more pages are not viewable to the one person until one or more other persons have signed, with the electronic signature service, a source document of the document package.

9. A system comprising:
    a microprocessor for executing instructions stored in a memory device, the instructions, when executed to cause the system to:
    receive at a server operating an electronic signature service a plurality of files representing source documents, wherein at least one respective source document includes associated metadata defining visibility rights and signature requirements for the respective source document;
    convert the plurality of files to a single file representing a document package having a file format consistent with a portable document format (PDF);
    receive a plurality of message addresses with each message address identifying a person, of which at least one person is to execute a source document included in the document package by providing an electronic signature to be associated with the source document;
    generate document visibility rights and signature requirements corresponding to one or more people identified by the plurality of message addresses for each portion of the document package at least partially based on the metadata defining visibility rights and signature requirements for the at least one source document: and
    communicate a message to each of the message addresses associated with a person, each message having a customized link to access the portions of the document package based on the visibility rights and to submit digital signatures required by the signature requirements.

10. The system of claim 9, wherein the instructions further cause the system to:
   receive a request to view the document package;
   determine which person is associated with the request;
   access the document visibility rights of the particular person associated with the request;
   generate with an image filter module images of an instance of the document package with only those pages that the particular person has been authorized to view, as indicated by the document visibility rights for that particular person.

11. The system of claim 9, wherein the instructions further cause the system to:
   receive a request to download die document package;
   determine which person is associated with the request;
   access the document visibility rights of the particular person associated with the request;
   generate with an outbound document generator module an instance of the document package with only those pages that the particular person has been authorized to view, as indicated by the document visibility rights for that particular person.

12. The system of claim 9, wherein the instructions further cause the system to:
   specify the pages of the document package that one or more groups of people can view.

13. The system of claim 12, wherein the instructions further cause the system to:
   generate document visibility rights for each person based on which group of the one or more groups die person is a member.

14. The system of claim 12, wherein at least one group is defined by an account established with the electronic signature service.

15. The system of claim 12, wherein at least one group is defined by a domain name of a message address of persons to receive and/or sign a source document in the document package.

16. The system of claim 12, wherein a document visibility right for one person that is to receive or sign a source document in the document package is established as a conditional rule such that at least one or more pages are not viewable to the one person until one or more other persons have signed, with the electronic signature service, a source document of the document package.

\* \* \* \* \*